US005319832A

United States Patent [19]

Clement

[11] Patent Number: 5,319,832

[45] Date of Patent: Jun. 14, 1994

[54] INTERNAL BEARING PULLER TOOL

[76] Inventor: Jean B. Clement, RR 1 Boite 7, Suite 21, Grande Anse, N.B., Canada, E0B 1R0

[21] Appl. No.: 885,046

[22] Filed: May 18, 1992

[30] Foreign Application Priority Data

Jun. 13, 1991 [CA] Canada ............................ 2044576

[51] Int. Cl.[5] ............................ B23P 19/04

[52] U.S. Cl. ............................ 29/266

[58] Field of Search ............................ 29/259, 266, 256

[56] References Cited

U.S. PATENT DOCUMENTS 3,270,407 9/1966 Araujo ............................ 29/259

4,057,889 11/1977 Ferguson ............................ 29/266

FOREIGN PATENT DOCUMENTS 494711 10/1938 United Kingdom ............................ 29/266

*Primary Examiner*—Robert C. Watson

[57] ABSTRACT

A bearing located internally and concentrically with respect to a hollow cylinder, such as a truck axle or a paper making machine cylinder, may at times be difficult to remove by conventional tools, especially if the bearing possesses a broken part or contains a flaw. The present tool provides a U shaped bridge having feet adapted to rest on the end of the cylinder, which becomes a foundation for operation of the device; centrally of the bridge there is a turnscrew member like a bolt, the lower end of which including a blocking nut, while the bolt is surrounded by a sliding plaque provided with an elongated U shaped opening, the smaller side of the opening being barely sufficient to surround the bolt the plaque is rectangular of smaller side lesser than the inside of the bearing and larger side smaller than the outside of the bearing. A second bolt located one, the transverse part of the bridge is directed towards the closed end of the plaque so that when a force is applied on the central bolt and the second bolt is resting on the closed end of the plaque the open U end of the plaque may be brought to bear against a desirable area of the bearing.

5 Claims, 6 Drawing Sheets

INTERNAL BEARING PULLER TOOL

The present invention relates to improvements in means for removing bearings localized centrally with respect to cylindrical bodies such as truck axles and paper making machines, by passing an element of withdrawal through the central part of a surrounded bearing, and behind said bearing, only one end of said element needing to rest against a part difficult to remove. The invention is especially meant to remove discontinuous or broken bearings, by applying one end of the element against a solid part, the other end being maintained parallel, as a witness to the raised portion of a bearing.

The pulling of an object from behind is not new: in a conventional well, a cable held on a structure with feet resting on the frame of the well, is used as a junction means between a pail being pushed towards the surface of water by gravity, and the supporting structure of the well; while the pail is still joined by the cable to the superior structure of the well, the pail takes a position for easily penetrating under the surface of water and finally the pail is brought back with the charge of water to the structure of the well. If the handle of the pail were not centered one could nevertheless imagine a rigid member which could be brought to bear against the elevated part of the superior perimeter of the pail and which could maintain the pail level during the full operation of pail raising.

The principle of drawing water from wells have been slow to be applied to methods of pulling bearings from behind.

In Canadian Patent 1,279,765 November 1986 Parrott discloses a centrally located wedge member.

Claps in U.S. Pat. No. 2,609,597 September 1952 illustrates a bridge shoulder with a central part which may be enlarged.

Davis in U.S. Pat. No. 2,720,021 October 1955 illustrates a screw provided with automotive head and pulling fingers located on the interior side of the bearing.

Garman in U.S. Pat. No. 3,200,484 August 1965 discloses a disc with elongated central opening.

Sullivan in U.S. Pat. No. 4,542,571 March 1984 discloses a flat insertion element which is first passed through the bearing. The insertion element is provided with a thread, and a bolt is passed through the center of the bearing and made to engage in said thread. The device may not retrieve both a bearing and an oil seal at the same time because of lack of legs attached to supporting means.

Kinsella in UK 494711 shows a rotatable pivoted tongue enabled to be turned to a crosswise position but such tongue is fixed to the turnscrew member and relies on a continuous board to be retracted.

Tackley in UK 564286 provides an inverted yoke whose legs are directed outwardly radially and whose lift component is related to the angle of contact between the legs and the bottom of the bearing at the point of junction with the surrounding wall .

It is an object of the invention to provide a retrievable support which may bear against one point behind a bearing and pull the whole bearing from behind . Another object of this invention is to provide a bearing puller that can easily and quickly help remove bearing stubs or any materials that have to be torn away from a periphery.

The above mentioned and other advantages of the invention will be better understood in reference to the following description and drawing figures (FIGS.) in which:

FIG. 6 . . . with the plate having reached its final position behind and under the bearing, with screw cut.

FIG. 1O is a cut according to line 10—10 of FIG. 4 when bearing is in position of removal.

Figure 1:
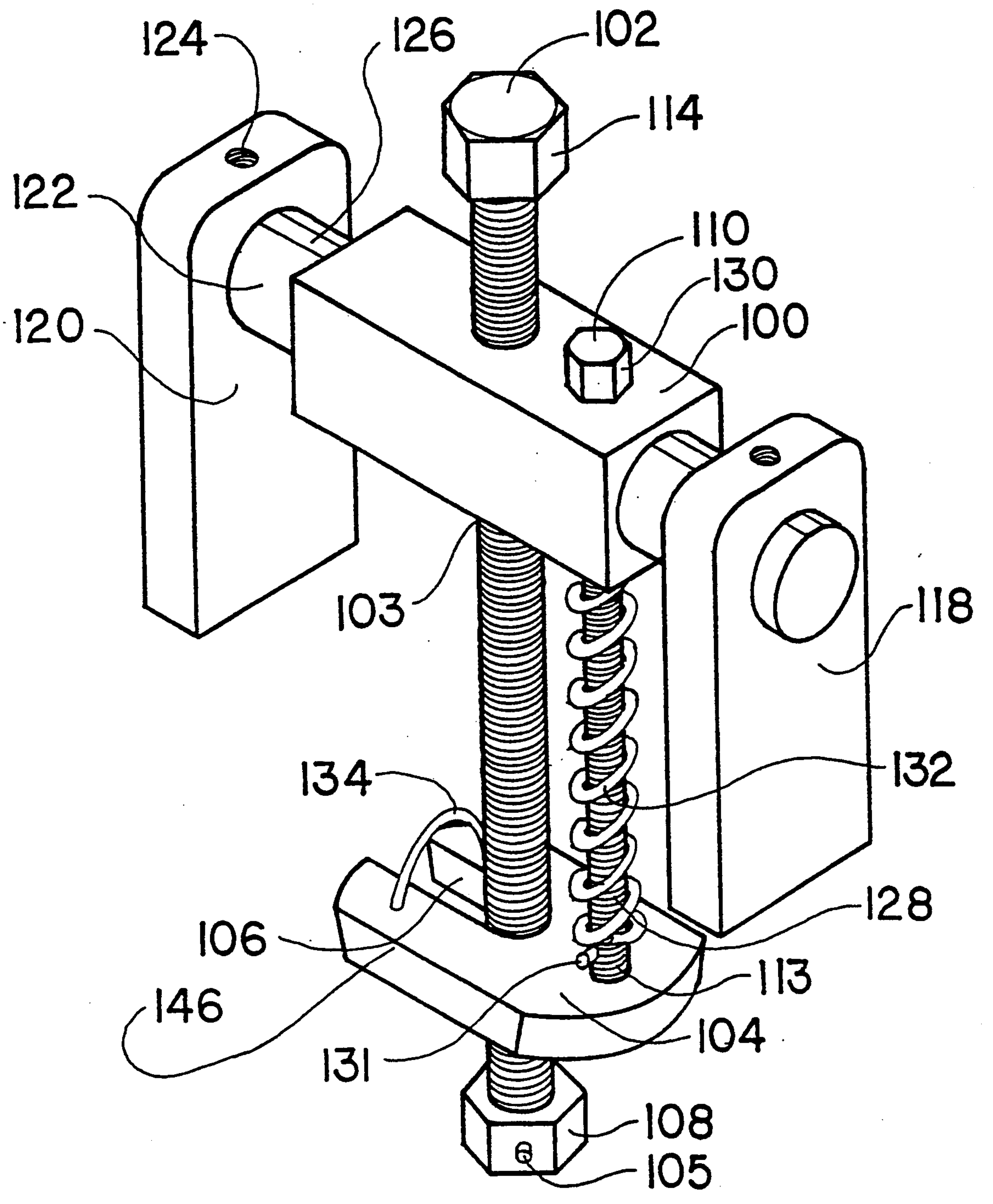
FIG. 1 is a perspective of the apparatus with all its pieces.
Figure 2:
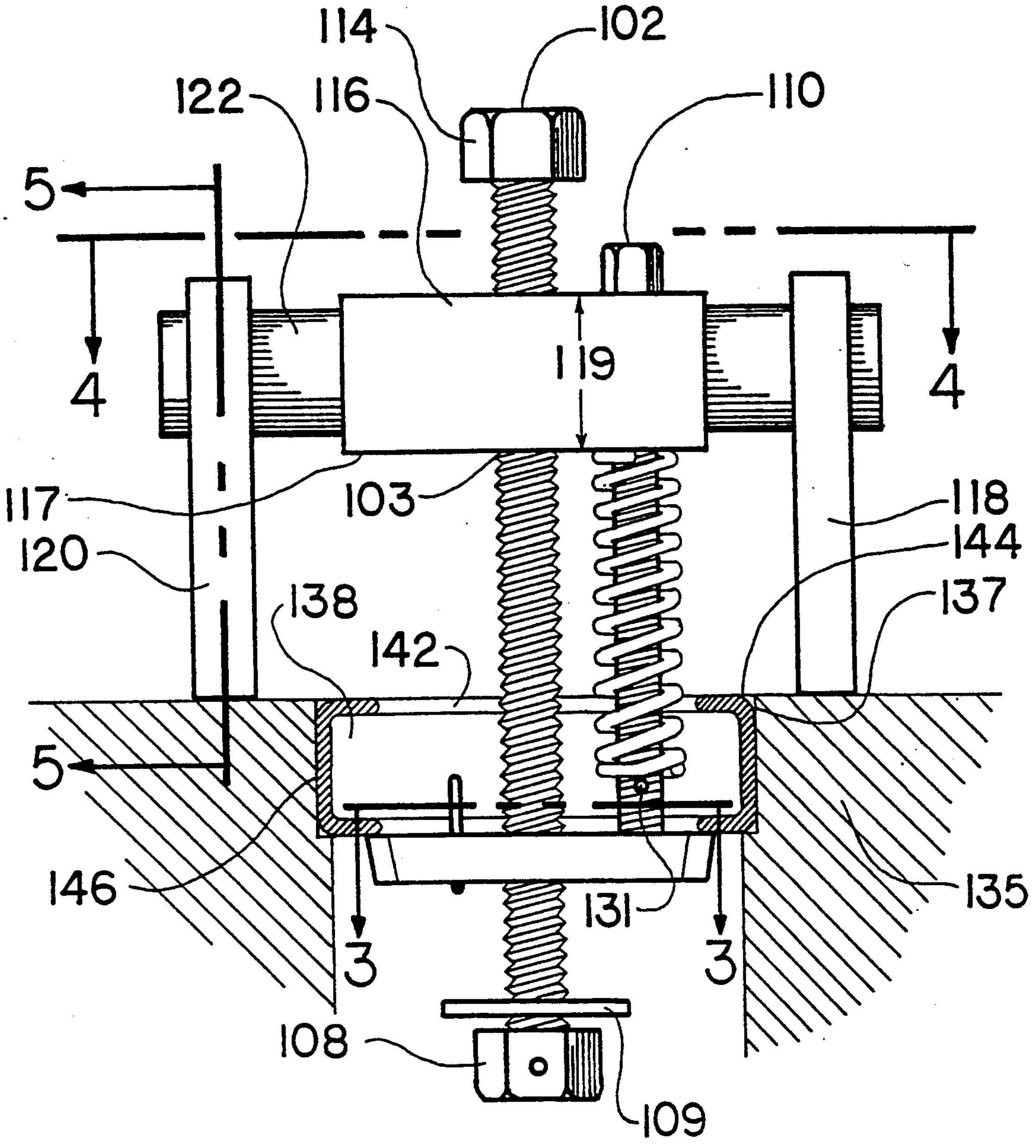
FIG. 2 is a side view of the puller with the pulling element in working position under a bearing with bearing and support in cut view.
Figure 4:
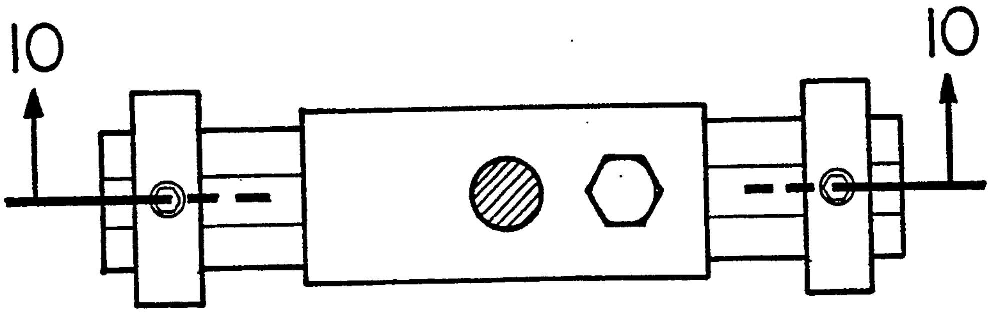
FIG. 4 is a cut view of puller shoulder according to line 4—4 of FIG. 2.
Figure 5:
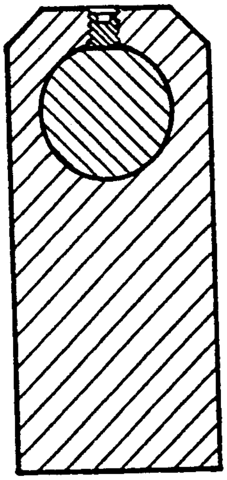
FIG. 5 is a cut view of puller arm according to line 5—5 of FIG. 2.
Figure 3:
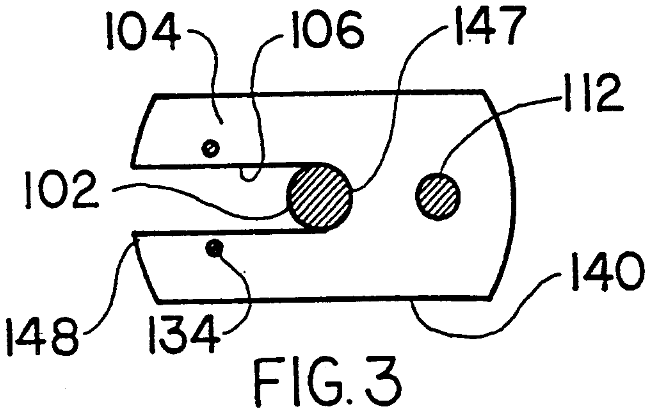
FIG. 3 is a cut view of sliding plate according to line 3—3 of FIG. 2.
Figure 8:
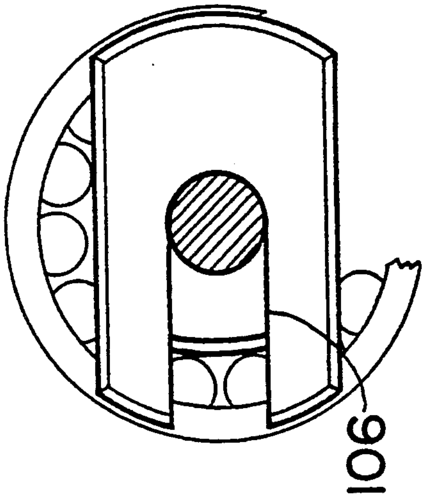
FIG. 8 is a side view as per . . .

Referring to the drawings, the elements of the preferred embodiment of the bearing puller are shown in FIG. 1, namely a frame number 100, a long screw 102, a half-oval plate 104 with an elongated U shaped hole 106, a lock nut 108, a support washer 109 . . . FIG. 2 . . . and an auxiliary rod 110. Also shown in FIG.3, is a support cavity 112 to receive the foot 113 of rod 110. The long screw 102 possesses threads 103 passing trough the frame 100. The hexagonal head 114 of bolt 102 is of the size for regular use in a mechanic garage with air pressure tools.

Frame 100 may be considered as a support with a transversal part 116 . . . FIG. 2 . . . which may be adjustable in length and adapted to support the rods 102 and 110, and two legs 118 and 120 one on each side of central bolt 102, each leg such as leg 102 loosely mounted on the end 122 of frame 100 and tied to the end 122 by means of a screw 124 which engages through leg 120 into a groove 126 in end 122. The auxiliary rod 110 also passes through transverse part 116 and may be fitted to part 116 by threads 128 such as threads 103 of bolt 102 and provided with hexagonal head 130 for pneumatic tightening. At the bottom 117 of part 116 the rod 110 may be surrounded by a spring 132 located between the foot 113 and the transverse part 116.

Figure 6:
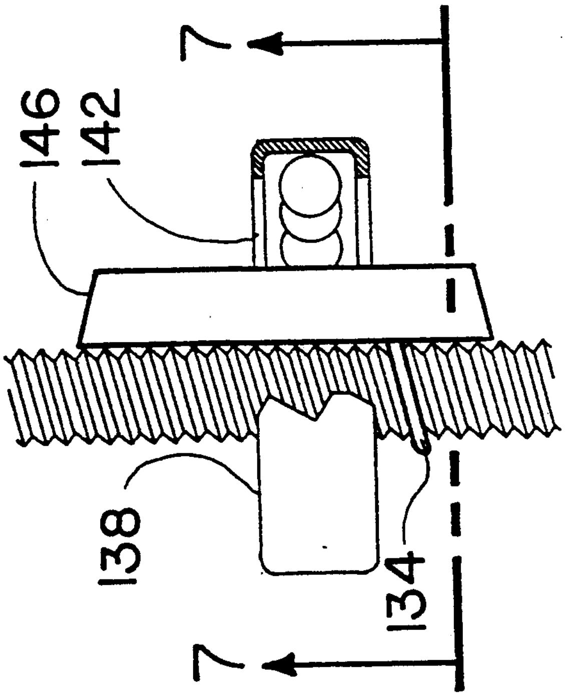
FIG. 6 is a side view of the puller with the plate in sliding position before entering a bearing which is cut.
Figure 10:
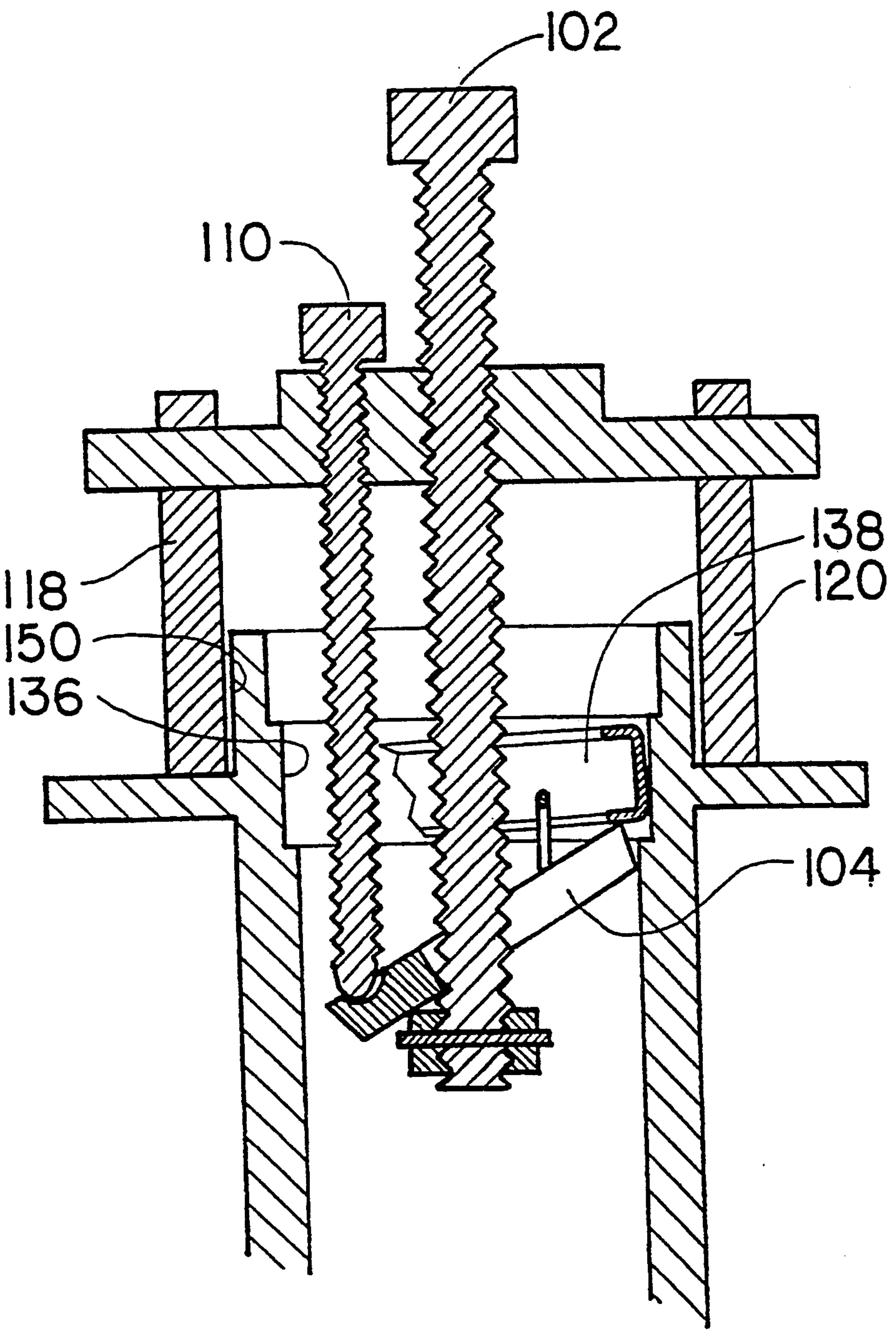

The plate 104 is provided with a locking spring pin 134 which straddles the U opening 106. In installation a hollow body 135 such as a truck crank-case axle may comprise on its inside face 136 . . . FIG. 10 . . . a truck bearing 138. The length of the screw 102 is at least equal to the length 140 . . . FIG. 3 . . . of the long side of the plate 104 plus the thickness 146 . . . FIG. 6 . . . of plaque 104 to allow for inclining and placing plate 104 along the screw 102 before engaging in the inside diameter 142 of bearing 138. The length of the transverse part 116 between the legs 118 and 120 is sufficient for covering the outside diameter 144 . . . FIG. 2 . . . of bearing 138, and the threaded part 103 of bolt 102 is sufficient in length to cover the depth 146 of bearing 138 plus the length 140 . . . FIG. 3 . . . of the plate 104, plus the thickness 119 . . . FIG. 2 . . . of the shoulder 116, the thickness 146 of the plate and the space of the locking nut 108. The length of the legs permits to position the shoulder 116 with respect to a bearing 138 . . . FIG. 10 . . . on the surrounding surface: the legs 118 and 120 are adapted to rest on the face 137 . . . FIG. 2 . . . of a hollow body 135 in which is placed the bearing 138. The plate 104 will have at first a width "W" 139 . . . FIG. 3 . . . smaller than the internal diameter 148 "D" . . . FIG. 2 . . . of bearing 138. The plate 104 on her length "L" 140 comprises the length of the elongated hole 106 plus twice the diameter of the long screw 102, the elongated opening 106 being adapted to surround screw 102, in the way that the horizontal projection of the inclined flat plate 104 corresponds to the diameter "D" of the bearing . . . FIG. 2 . . . .

Figure 7:
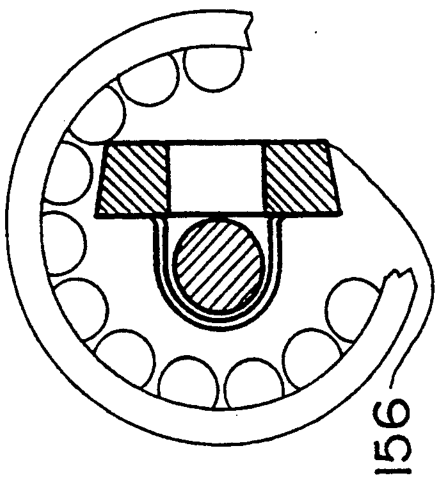
FIG.7 is a bottom view according to line 7—7 of FIG. 6.
Figure 9:
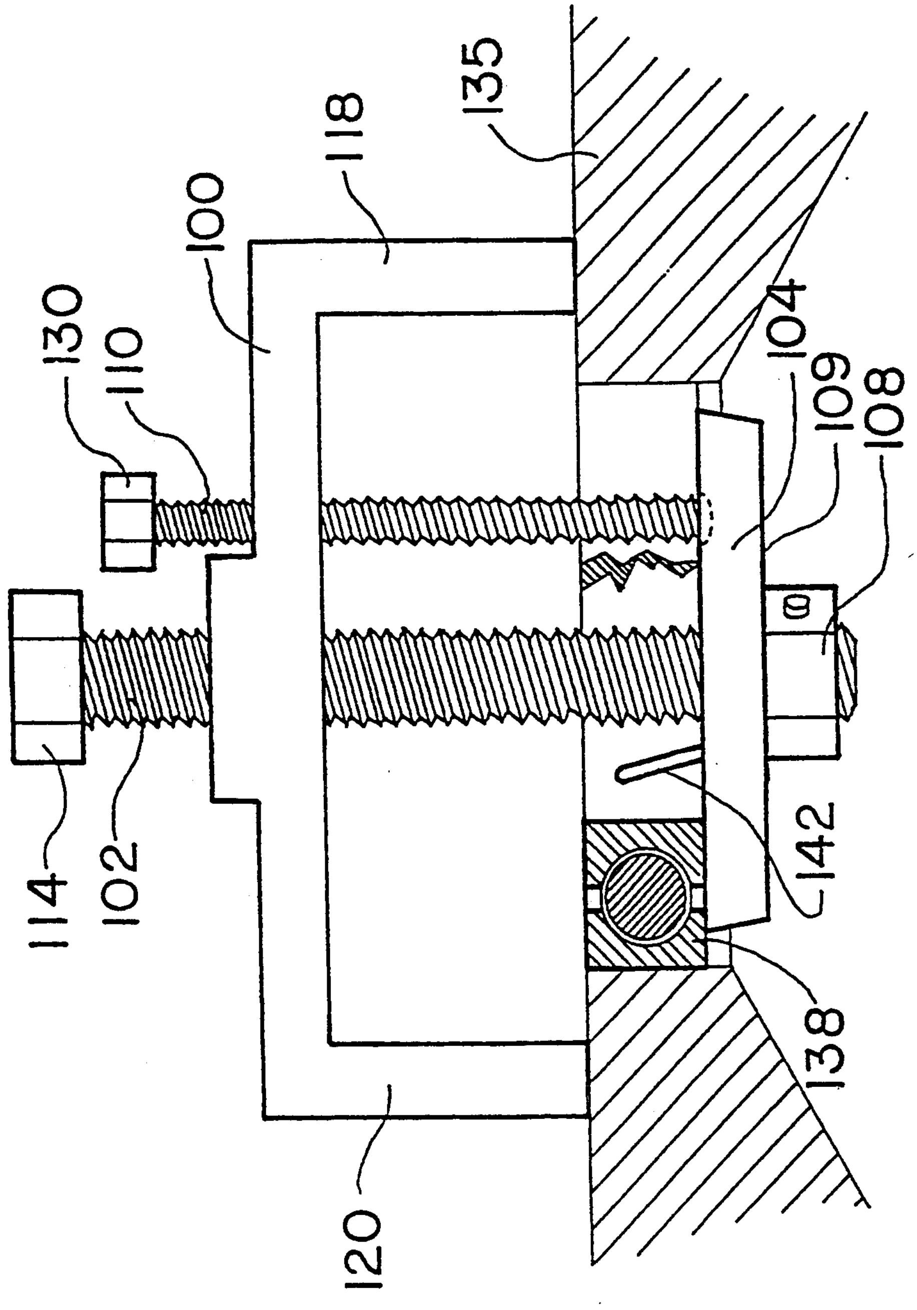
FIG.9 is a front view of the puller of FIG. 6 and its support element with a cut of a broken bearing, the puller being in removing position.

It is preferred that the elongated hole 106 not be longer than diameter "D" 142 allowing a length "L" of the plate of: $L=D+2d$, where "d" is the diameter of the trunk or screw 102. For a diameter "D" of $1\frac{1}{2}$" and a screw of diameter "d"=$\frac{1}{2}$", $L=2\frac{1}{2}$". Considering that the plate is not flat but rather of a thickness "t" 146 about half the diameter of the screw 102, a correction must be applied on the excess of material caused by this thickness 146, otherwise it will require a larger hole. The closing pin 134 which is placed completely in front in a manner to allow the passage of the trunk 102 without interfering with the thickness "t" 146 of the plate 104 when the side 148 . . . FIG. 3 . . . of said plate is suspended vertically for inserting through the bearing 138 . . . FIG.6 . . . For minimizing the thickness "t" 146 of the plate 104 on the side of sharp edge 156 . . . FIG. 7 . . . , polishing of asperities may be performed to facilitate insertion into the annular member.

The spring 132 in normally compressed between a stopper pin 131 and the bottom face 117 of transverse part or shoulder 116 to stabilize the bolt 110 in a steady position. The spring pin 134 may be replaced by some locking arrangement. A safety pin 105 tolerates so much pressure before breaking, to prevent damage to the puller.

The thickness 146 of the plaque 104 may be varied according to the strength of the material used in the application, a $\frac{3}{4}$ ton truck bearing requiring a thicker plate than a $\frac{1}{2}$ ton truck. The legs 118 and 120 must typically be $4\frac{5}{8}$" long for a $\frac{3}{4}$ ton truck.

In general the objective is to develop a pulling device for removing a rigid annular member from within an aperture made in the wall of a generally closed housing such as a truck axle. The annular member may be a type of bearing releasably anchored to an axle housing. By releasable anchor, I include friction fit means or other means such as knurling, or magnetic means.

The annular member defines a through channel, an the pulling device is to comprise:

- an elongated screw member destined to engage through the channel and into the housing,
- a bridge member mounted on the outer face of the housing in register with the housing aperture, the bridge member having a first threaded bore being threadedly engaged by the screw member; the length of the legs of the bridge member varies; people familiar with the art know
- an integral abutment member loosely carried at the inner end of the screw member, such abutment member not tied to the screw;
- means for mounting the abutment member to the screw member inner end for relative movement thereabout,
- the abutment member having an operative surface over which the pulling loads are distributed for coming in contact with the inner wall of the annular member,
- wherein by screwing the screw member with the abutment member located in the housing, the abutment member operative surface comes to abut against the annular member and brings the annular member outwardly of the housing aperture against the bias of the anchor means, the surface of the abutment member being lesser than that of the housing aperture but greater than that of the annular member through channel,
- the abutment member defining a first inoperative position of transverse width smaller than the channel, for free inward passage therethrough and a second operative position for outward movement from the inside of the housing.

A device further including a second screw member mounted on a second threaded bore, the threaded bores parallel to each other, the second screw member defining an inner free end in register with the abutment member and releasably abutting against a cavity on the operative surface of the abutment member in the abutment member operative position, wherein the second screw member is for use with a fragmented annular member.

A preferred embodiment and a minor variation of the subject invention is described herein. However, it will be understood that other embodiments and variations of the one described are possible within the scope of the invention which is limited only by the scope of the appended claims.

What is claimed is:

1. A pulling device for displacing and removing a rigid annular member from within an aperture made in the wall of a generally closed housing said annular member of the type being releasably anchored to said housing within said aperture by releasable anchor means, said annular member defining a through channel, said annular member possessing a face localized within said housing, said pulling device comprising:

- a "U" shaped bridge made up of two legs and a shoulder, of which the legs are adapted to rest against a face of said wall and the shoulder is installed transversely of the aperture of the wall,
- a tie rod which extends through and is perpendicularly displacable relative to said shoulder, said tie rod having a first end localized externally to the central part of said "U" and the second end internally to said "U" in the direction of said housing, said second end being capable of displacement from a position between a first position inside said housing and a second position outside said housing, said tie rod comprising abutting means mounted at said second end of said tie rod, and comprising pulling means localized on said first end of said tie rod,
- a "U" shaped abutment member with the open part of said "U" shape adapted to surround said tie rod and inclined with respect to said tie rod when said tie rod is being inserted through said aperture, said abutment member possessing an operative surface adapted to be positioned against said face of said annular member, said abutment member being sufficiently long to generally cover said annular member,
- an abutment rod which extends through said shoulder and which may be displaced perpendicularly relative to said shoulder, said rod being parallel and spaced apart from said tie rod, the operative surface of said abutment member being in register with the end of said abutment rod.

2. A device as defined in claim 1 in which said operative surface is provided with a cavity adapted to receive the end of said abutment rod.

3. A device such as defined in claim 5 in which said tie rod is a bolt threaded through the thickness of said shoulder.

4. A device as defined in claim 1 wherein said tie rod is sufficiently rigid to exert a pulling force to move said rigid annular member and is sufficiently long to cover the thickness of said shoulder plus the thickess of said annular member plus the length of said elongated abutment member so that, the exerting of a pulling force on said first end of said tie rod causes the displacement and removing of said annular member.

5. A pulling device for removing a rigid annular member from within an aperture made in the wall of a generally closed housing said annular member of the type being releasably anchored to said housing within said aperture by releasable anchor means, said annular member defining a through channel, and having an inner wall within said aperture said pulling device comprising:

an elongated first screw member destined to engage said inner wall through said channel, a bridge member mounted on the outer face of said housing in register with said housing aperture, said bridge member having a first threaded bore being threadedly engaged by said first screw member, an integral abutment member carried at the inner end of said first screw member, means for mounting said abutment member to said first screw member inner end for relative movement thereabout, a second screw member mounted on a second threaded bore in said bridge member, said threaded bores parallel to each other, said abutment member having an operative face for coming in contact with said inner wall of said annular member, the size of said abutment member being less than that of said housing aperture but greater than that of said annular member through channel, said abutment member defining a first inoperative position of transverse width smaller than said channel, for free inward passage therethrough and a second operative position for outward movement from the inside of said housing, said second screw member defining an inner free end in register with said abutment member and releasably abutting against the operative face of said abutment member in said abutment member operative position wherein said second screw member is for use with a fragmented annular member, in the event that said annular member is broken and discontinuous in the area of said end of said abutment rod, wherein by screwing said first screw member against said abutment member located in said housing, said abutment member operative face comes to abut against said annular member and brings said annular member outwardly of said housing aperture against the bias of said anchor means.

* * * * *